Feb. 4, 1958          G. M. BEATTY          2,822,192
PIPE COUPLING WITH SOCKETED INFLATABLE SEALING MEMBER
Filed Dec. 7, 1953
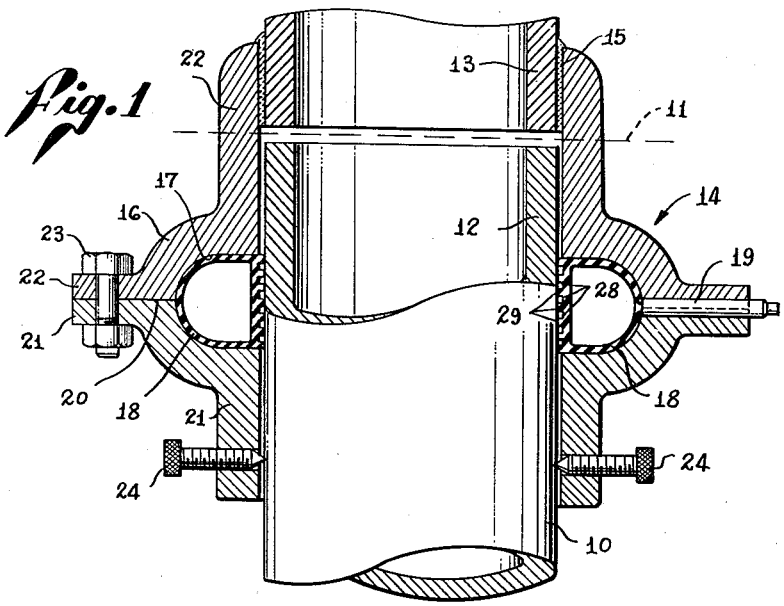
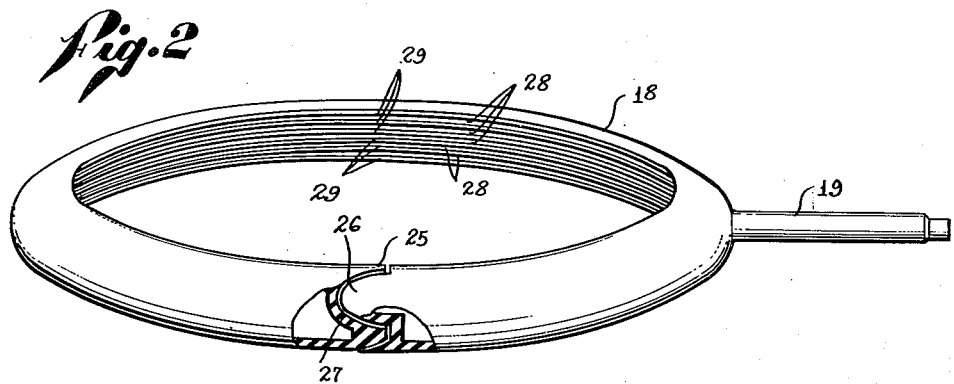
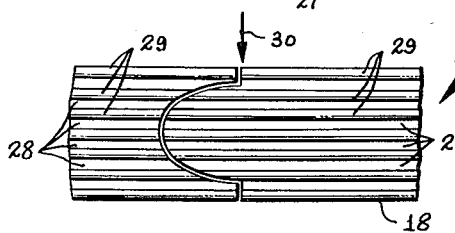
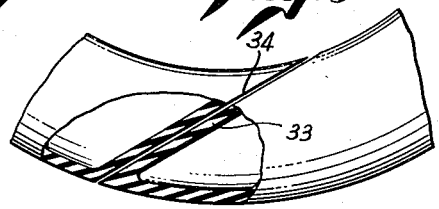
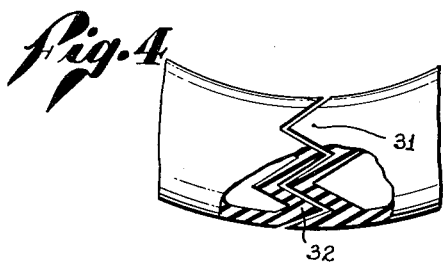
INVENTOR.
Guy M. Beatty
BY
Attorney

United States Patent Office 2,822,192
Patented Feb. 4, 1958

2,822,192

PIPE COUPLING WITH SOCKETED INFLATABLE SEALING MEMBER

Guy M. Beatty, Bakersfield, Calif.

Application December 7, 1953, Serial No. 396,529

2 Claims. (Cl. 285—97)

This invention is a continuation-in-part of my copending application Serial No. 316,934, filed October 25, 1952 now abandoned, and entitled "Pipe Coupling."

It is a primary object of the present invention to provide a fluid-tight coupling for temporarily connecting together two sections of pipe.

More particularly, it is an object to provide a pipe coupling which will effect a fluid-tight seal between two pipes, and yet which may be easily removed and subsequently used substantially an unlimited number of times.

Another object is to provide a pipe coupling incorporating a fluid-tight sealing means which may be removed and replaced without having to misaline the pipe sections.

A specific object of the invention is to provide a pipe coupling useful for coupling a conductor pipe in oil well drilling operations.

These and further objects of the invention are attained by means of a split cylindrical sleeve adapted to surround the ends of two pipes to be coupled together. Intermediate the ends of the cylindrical sleeve there is provided a radially expanded portion defining an internal annular recess for accommodating fluid sealing expandable means in the form of an inflatable inner tube. One end of the coupling sleeve section may be integrally secured to one of the pipes while the other end is adapted to receive the pipe to be connected.

The sleeve is preferably split transversely in the plane of the annular recess to form two half-sleeves normally bolted together. The inner tube itself comprises an elongated tube bent around in a circle with its ends suitably shaped to overlap. This construction permits removal of the inner tube from the annular recess without necessitating misalining the pipes, by simply sliding down one half-sleeve section and unwrapping the tube.

With the inner tube in place and the sleeve-halves properly fitted over the pipe ends to be connected, the inner tube is expanded against the sleeve recess and the connecting pipe, by pumping in fluid such as compressed air, thereby effecting a seal between the sleeve and the pipe.

One of the coupling sleeve section halves may be provided with suitable locking means, such as set screws for example, capable of being manually locked or released.

A better understanding of the several features and advantages of the invention will be had by referring to the accompanying drawings, in which:

Fig. 1 illustrates partially in section a preferred form of the pipe coupling as employed to connect a conductor pipe in oil well drilling operations;

Fig. 2 shows in perspective view a preferred form of sealing inner tube employed in the device of Fig. 1;

Fig. 3 shows the overlapping of the ends of the tube in Fig. 2 as viewed from the interior of the circle forming the tube;

Fig. 4 illustrates a portion of a modified type of sealing tube structure and;

Fig. 5 shows still another type of tube structure.

The invention will be described in connection with the conductor pipe used in an oil well drilling operation although it is to be understood that the pipe coupling may be employed in any instance where it is desired to connect two pipes together. In Fig. 1 there is shown an elongated conductor pipe 10 extending vertically upwardly from a cellar dug into the earth (not shown). Pipe 10 normally would terminate at a point substantially level with the bottom of an oil well derrick floor above which suitable rotary mechanism for the drilling operations (not shown) would be disposed.

In usual practice, this conductor pipe is in the neighborhood of 20" in diameter and constitutes an integral pipe section extending for a distance of from 10 to 12 feet above the cellar floor, and a number of feet below said floor. All of the drilling tools and subsequent casing for the well are introduced into this pipe and upon completion of the well, the conductor pipe is generally severed at a level 11, for example, which is on a level with the earth. The derrick and other drilling apparatus is then removed and the usual Christmas tree valves applied to the severed section for production. The severing of the conductor pipe is not only a time consuming and expensive operation but in addition, a new conductor section is necessary each time a new drilling operation begins.

In accordance with the present invention, the conductor pipe 10 may come in two sections 12 and 13, the section 12 extending upwardly from the cellar floor to a level with that of the earth, and the section 13, being coupled to the lower section 12 by a coupling sleeve designated generally by the numeral 14. As shown in Fig. 1, the sleeve 14 is cylindrically shaped and may be integrally attached to the upper section 13 of the conductor pipe as at 15 by welding or other suitable means. Intermediate the ends of the cylindrical coupling sleeve 14 there is provided a radially expanded portion 16 defining an internal annular recess 17. Recess 17 is shaped to accommodate a fluid sealing expandable means which takes the form of a rubber inner tube 18 connected to receive fluid such as air under pressure by means of a tubular stem 19. Stem 19 may be equipped with a valve such as the common tire valve.

The coupling sleeve 14 is transversely cut in the plane of the expanded portion 16 as indicated at 20 to form two sleeve-halves 21 and 22. These halves are normally bolted together as at 23. With this arrangement, access may be had to the inner tube 18 without having to move or misaline the pipe sections.

The lower pipe section 12 slidably fits within the sleeve-halves 21 and 22 as shown and the whole coupling 14 may be adjusted to a proper height and then locked against the pipe section 12 by means of set screws 24. With the two conductor pipe sections 12 and 13 arranged as thus shown, fluid under pressure is introduced through the valved inlet stem 19 and the inner tube 18 is inflated and urged against the outer wall of the lower section 12 and the inner recess 17 of the radially expanded portion 16, thereby effecting a fluid-tight seal completely around the lower pipe section.

In Fig. 2 there is shown an enlarged perspective view of the inner tube 18. The tube structure itself is formed by circling a tubular member to bring its ends together as at 25. These ends are closed off and provided with male and female interengaging shapes 26 and 27 respectively, whereby the end portions overlap. As shown, the end portion 26 comprises rounded projections adapted to fit within concave cavities 27 in the other end.

The inner periphery of the tube 18 has annular grooves and lands 28 and 29 to form sealing lips for engaging the outside surface of the pipe section 12. These lands and grooves present an alined surface in cross-section whereby the complete cross-section of the tube is generally D-shaped as clearly shown in Fig. 1.

The purpose of this tube structure is to provide a fluid-tight seal and yet permit removal of the inner tube without having to misaline the pipe sections. Thus, in the event the tube develops a leak or is punctured, it may be readily removed by simply unbolting bolts 23, lowering the lower coupling sleeve-half 21 to expose the recess, and unwrapping the tube 18 by disengaging the mating ends 26 and 27. A new inner tube may then be inserted in the recess and its ends suitably engaged. The lower sleeve-half 21 is then bolted in position and the new inner tube expanded. The expansion of this tube will lock the mating ends 26 and 27 together and there is no chance of a leak developing along this connection.

It is to be noted that an overlap of the tube is effected by proper shaping of the tube ends. This shaping is an important feature of the invention since it permits the above noted removal of the tube and yet effects a tight seal against the pipe surface when in place. This result is achieved because the inner land structures of one end overlap the outer land structures of the mating end as shown in Fig. 3. These mating ends are forced into tight engagement when the inner tube is inflated within the confining annular recess of the coupling sleeve and there is thus presented a highly resistant path to any fluid pressures exerted in the direction of the arrow 30.

Fig. 4 illustrates a modified shape for the ends of the tube 18. As shown, each end portion is provided with a sawtooth or serrated edge 31 and 32 positioned to mate together to form the required overlap. As in the embodiment of Figs. 2 and 3, the lands and grooves on the inner sides of the end portions will overlap to provide an effective seal.

Fig. 5 shows still another manner of forming the tube ends. In this instance, the ends are diagonally terminated in a complementary manner as at 33 and 34 to effect a tight seal.

Any one of the above-described tube structures may be employed as the fluid sealing means in the recess 17 of coupling 14. When the drilling operations have been completed, it is only necessary to release the fluid pressure in the inner tube 18 and manually unlock the screw locks 24 and then lift off the upper conductor pipe section 13 and coupling sleeve 14. This same section 13, together with the sleeve 14, may then be used again in the drilling of another well.

It is to be noted that the coupling sleeve means described in Fig. 1 is particularly well suited for use with the conductor pipes in drilling operations. The expandable inner tube may be readily fabricated and used a number of times, or if punctured it may be easily replaced without having to disturb the pipe positions. This inner tube is found to provide an excellent seal against any possible mud seepage through the coupling. Furthermore, with this arangement the conductor pipe need no longer be severed, but simply uncoupled as described above, resulting in a considerable savings in time and cost.

Various modifications of the coupling sleeve and inner tube structures will occur to those skilled in the art. The invention therefore is not to be thought of as limited to the precise embodiments disclosed.

I claim:

1. A fluid tight pipe coupling for joining adjacent, aligned pipe sections, comprising a coupling sleeve adapted to receive said pipe sections through its opposite ends, said sleeve being formed with an internal annular recess in a transverse plane thereof and comprising a pair of separable sleeve portions having opposing end faces located in said plane, means for securing said sleeve portions together with said end faces abutting one another; and a fluid seal within said recess comprising a hollow inflatable seal ring having an inner annular surface for sealingly engaging one pipe section and a radial valve stem extending outwardly from the ring through which pressure fluid may be introduced into the ring for inflating the latter, at least one of said abutting end faces of the sleeve portions being formed with a radial groove extending from said recess to the exterior of the coupling sleeve for receiving said valve stem.

2. The subject matter of claim 1 wherein said seal ring comprises an elongate inflatable member curved to conform to a ring and closed at opposite ends by abutting transverse end walls which are forced into fluid tight contact when the member is inflated, said end walls being shaped to define at least one recess extending into one end of the member and at least one tongue on the other end of the member engaging in and complementing said last mentioned recess to restrain the ends of the member against relative lateral displacement.

References Cited in the file of this patent

UNITED STATES PATENTS

| Number | Name | Date |
| --- | --- | --- |
| 6,974 | Moat | Dec. 25, 1849 |
| 491,539 | Fetner | Feb. 14, 1893 |
| 1,898,623 | Gammeter | Feb. 21, 1933 |
| 2,038,140 | Stone | Apr. 21, 1936 |
| 2,182,899 | MacClatchie | Dec. 12, 1939 |
| 2,306,160 | Freyssinet | Dec. 22, 1942 |
| 2,309,658 | Miller | Feb. 2, 1943 |
| 2,648,554 | Gilbert | Aug. 11, 1953 |